United States Patent [19]
Czernichowski et al.

[11] Patent Number: 5,993,761
[45] Date of Patent: Nov. 30, 1999

[54] CONVERSION OF HYDROCARBONS ASSISTED BY GLIDING ELECTRIC ARCS IN THE PRESENCE OF WATER VAPOR AND/OR CARBON DIOXIDE

[75] Inventors: Piotr Czernichowski; Albin Czernichowski, both of Orléans, France

[73] Assignee: Laxarco Holding, Ltd., Nicosia, Cyprus

[21] Appl. No.: 09/005,647

[22] Filed: Jan. 12, 1998

[30] Foreign Application Priority Data

Jan. 13, 1997 [FR] France .................. 97 00364

[51] Int. Cl.$^6$ .............. C01B 3/00; C01B 31/00; C10J 3/00; C10L 3/00; C25B 1/00
[52] U.S. Cl. ............... 423/210; 423/246; 423/248; 219/383; 204/170; 204/173; 48/202; 48/210
[58] Field of Search .................. 219/383, 121 P; 204/170, 173; 585/539, 537; 48/202, 210; 252/373; 423/210, 246, 248

[56] References Cited

U.S. PATENT DOCUMENTS

| | | | |
|---|---|---|---|
| 4,144,444 | 3/1979 | Dementiev et al. | 219/383 |
| 4,588,850 | 5/1986 | Mueller et al. | 585/539 |
| 4,606,799 | 8/1986 | Pirklbauer et al. | 204/170 |
| 4,861,446 | 8/1989 | Blom et al. | 204/170 |

OTHER PUBLICATIONS (Abstract) Lesueur et al., "Electrically Assisted Partial Oxidation of Methane", International Journal of Hydrogen Energy, 19 (2), pp. 139–144, 1994.

International Search Report for PCT/US98/00393 dated May 4, 1998.

*Primary Examiner*—Steven P. Griffin
*Assistant Examiner*—Eileen E. Nave
*Attorney, Agent, or Firm*—Conley, Rose & Tayon, P.C.; Mark L. Berrier

[57] ABSTRACT

Method for conversion of hydrocarbons assisted by gliding electric arcs in the presence of water vapor and/or carbon dioxide.

The objective of the process and the plasma assistance device to steam reforming, to the reforming with CO2 or to simultaneous reforming with an H2O/CO2 mixture of hydrocarbons is the production of gases rich in CO and H2, containing also high ratios of C2H2, C2H4 and C3H6, without formation of soot or coke. The process makes it also possible to upgrade the CO2 by converting it into CO in the presence of hydrocarbons.

This mixture of valuable products is obtained in a reactor /1/ with electric gliding arcs /4/ which strike directly into an endothermic reaction medium consisting of hydrocarbons mixed with H2O and/or CO2. The reactor is equipped with a diaphragm /19/ with a convergent/divergent hole /20/ to reinforce the agitation of the arcs with the load to be converted and, at the same time, to have the conversion of the load progress after prolonged contact with catalytic species derived from the plasma.

27 Claims, 2 Drawing Sheets

CONVERSION OF HYDROCARBONS ASSISTED BY GLIDING ELECTRIC ARCS IN THE PRESENCE OF WATER VAPOR AND/OR CARBON DIOXIDE

RELATED APPLICATIONS

This application is based on a French patent application, National Registration No. 9700364, filed Jan. 13, 1997.

BACKGROUND OF THE INVENTION

This invention concerns a hydrocarbon conversion process assisted by special gliding arc plasma in the presence of carbon dioxide ($CO_2$) and/or water vapor. This process is illustrated by the conversion of two model mixtures in an arc reactor equipped with a maturation post-plasma compartment:

- a natural gas containing mainly methane and some ethane, propane and butanes,
- a "propane" containing some ethane and butanes. Therefore, the invention can be applied to any pure hydrocarbon, such as $CH_4$, $C_2H_6$, $C_3H_8$ or $C_4H_{10}$ and to their mixtures.

In the presence of water vapor and/or of $CO_2$, it is then possible to convert, totally or partially, all these hydrocarbons basically into synthesis gas (consisting of a majority of hydrogen $H_2$ and of carbon monoxide $CO$), but also into other valuable products, such as ethylene ($C_2H_4$), acetylene ($C_2H_2$) and propane ($C_3H_6$), and all without using traditional catalysts. The process is based mainly on steam reforming reactions, such as:

$$CH_4 + H_2OVAP = CO + 3H_2 \quad (1)$$

$$C_2H_6 + 2H_2OVAP = 2CO + 5H_2 \quad (2)$$

$$C_3H_8 + 3H_2OVAP = 3CO + 7H_2 \quad (3)$$

$$C_4H_{10} + 4H_2OVAP = 4CO + 9H_2 \quad (4)$$

reforming reactions with carbon dioxide, such as:

$$CH_4 + CO_2 = 2CO + 2H_2 \quad (5)$$

$$C_2H_6 + 2CO_2 = 4CO + 3H_2 \quad (6)$$

$$C_3H_8 + 3CO_2 = 6CO + 4H_2 \quad (7)$$

$$C_4H_{10} + CO_2 = 8CO + 51H_2 \quad (8)$$

cracking reactions, such as:

$$2CH_4 = C_2H_4 + 2H_2 \quad (9)$$

$$2CH_4 = C_2H_2 + 3H_2 \quad (10)$$

$$C_2H_6 = C_2H_4 + H_2 \quad (11)$$

$$C_2H_6 = C_2H_2 + 2H_2 \quad (12)$$

$$C_3H_8 = C_3H_6 + H_2 \quad (13)$$

$$C_4H_{10} = 2C_2H_4 + H_2 \quad (14)$$

$$C_4H_{10} = 2C_2H_2 + 3H_2 \quad (15)$$

as well as single and inverse water shift:

$$CO + H_2O = CO_2 + H_2 \quad (16)$$

$$CO_2 + H_2 = CO + H_2O \quad (17)$$

All these reactions are performed in a medium highly activated by the presence of a special plasma produced by the gliding electric arcs. The activation of the medium is evident by the presence of rather unusual species (with respect to the traditional hydrocarbon conversion conditions) originating from the matter in which these arcs are developed. Thus, electrons can be detected, as well as atoms, ions and/or molecular radicals such as: H, OH, O, $O_2$, $H+$, $O+$, $O_2+$, $OH-$, $HO_2$, $CH_3$, $CH_2$, $CH$, $C_2$ and many others. Most of these species can exist in their excited electronic or vibrational states with a very long lifetime. They are also known as being extremely active chemically.

The production of synthesis gas starting from light saturated hydrocarbons is a very well-known and very important stage, especially for the upgrading of natural gases. The most used process at the present time, the catalytic steam reforming (or "steam reforming) encounters major problems. In principle, a high temperature (thermodynamic ratio) and a high pressure (for kinetic ratios) are sufficient for this process. However, in practice, despite the know-how for the production of "synthesis gas" according to the processes, the joint management of the compositions, pressures and temperatures is delicate, even impossible without resorting to catalysts.

Then, in order to perform natural gas (mainly rich in methane) reforming with water vapor, usually a catalytic way is sought: presence of an active solid substance for temperatures which can be attained without too much difficulty. Therefore, the traditional steam reforming technology uses furnaces in which several hundred fragile metal tubes (filled with a catalyst and having a length which can reach several dozen meters) are located, heated with natural gas. This technology is tied to the very strong drops in pressure and, especially, in heating energy. The temperature which the furnace pipes can withstand prevents also the reduction of $CO_2$ content (awkward product originating from a parasite reaction at too low a temperature).

Other problems are connected with catalyst poisoning (by sulfur and/or nitrogen), with catalyst aging, with the necessary excess of water vapor and/or with the formation of soot which blocks the tubular system at a macroscopic scale and, most of all, the microscopic pores of the catalyst. These problems are observed particularly with steam reforming of hydrocarbons heavier than methane; they are more fragile and, hence, more coking.

The conversion of hydrocarbons according to the endothermic reactions (1) through (15) requires a supply of energy (preferably "clean"), without connection with any internal or external combustion. The best way to promote these reactions would be to strike electric arcs directly in the medium to be converted, imposing a permanent distribution of energy in the largest volume to be treated. The transfer of energy of electric origin to the gas mixture would be made by direct transfer of the energy to the molecules. This would result in excitation, ionization and dissociation phenomena and also in part by Joule effect, considering the ionized mixture as a gaseous conductor. This is to say that the gaseous mixture, which has been made into a conductor after ionization, itself due to dielectric breakdown (hence, a preionization) between electrodes brought to different potentials, would be considered as an electric resistance and, at the same time, as a sort of electrolyte in gaseous phase: the plasma.

Plasma is defined as the fourth state of matter and, therefore, cannot in any case be taken as a criterion of similitude for previously known different processes. Wanting to claim the concept of plasma or any type of reaction capable of developing at the plasma state, comes to wanting to claim all the reactions developing at the liquid state . . .

There are one thousand one types of plasma, and one thousand one ways to obtain these plasmas. By definition (simplified), plasma is a gaseous medium in which the particles are in part ionized. Likewise, a part of the electrons is not associated with an atom, a molecule, an ion or a radical. Thus, even though globally, at a scale of a few microns, the medium is electrically neutral, two large families can be defined, in a simplistic way: the heavy particles (radicals, atoms, molecules and ions) and the electron cloud.

In most plasmas, the main macroscopic physical parameter—temperature—is the same for all the components: this is thermodynamic equilibrium. These conditions can be very easily obtained: it is sufficient to supply much energy, as in the case of plasma torches (plasmatrons, for some), where the plasma is produced by a very high electric arc current. There are also other devices capable of generating this state, such as, for example, induction or radiofrequency torches whereby the gaseous medium becomes resonant with an electric circuit. Such plasmas are called thermal plasmas by the experts. It is obvious that a thermal plasma will modify the chemistry of a gas medium, simply by destroying all the molecules, particularly the fragile ones, such as the hydrocarbons. The fragments found at the end of the process originate from partial recombination phenomena, often yielding too simple molecules. Such chemistry offers very poor prospects, requires much energy and presents problems connected with the high temperature (such as the resistance of the materials).

Professional chemists indisputably prefer the idea of a plasma which does not respect the conditions of complete thermodynamic equilibrium. For example, it is sufficient to act on the free electrons by taking advantage of the fact that they are much lighter. It is also possible to act on the rotation or vibration properties of some molecules. In terms of energy, this comes to breaking the energy exchange equilibrium between the plasma and the surrounding medium (heat, electrical energy, radiation, etc.). This state is qualified as non-equilibrium. Such plasmas are often called "low temperature" plasmas, although the concept of temperature cannot be used: there are several methods whereby such plasmas may be generated: microwaves, electron beams, flame front, etc. However, the generators of these plasmas are rare on an industrial scale and are appropriate only for a very precise application. This is the reason why, despite the great number of patents, such plasmas are rarely used in chemistry.

Also, when a plasma is established or when its existence is ended, the equilibrium is broken. These transitory states are actually non-equilibrium plasmas and last only a few milliseconds. One type of plasma takes advantage of this phenomenon, the gliding electric arc plasma, known under the name of "GlidArc", a relatively recent invention (1968) by H. LESUEUR et al. ["Low Temperature Plasma Generation Device through the Formation of Gliding Electric Discharges", BF 2,639,172]. Outside of the numerous geometric possibilities of a GlidArc plasma generator, and in a very global way, the parameters on which a chemist can act are: pressure, temperature, gas speed, current, electrical frequency and voltage. Such a number of parameters exceeds the conventional reasoning capabilities of the man of the trade. For each application, a real know-how and an inventive activity are necessary in order to obtain a result the objectives of which are both the economic profitability and the respect of the ecological principles. The approach allowed by the GlidArc enables the chemist to envision the distribution of a supply of energy directly in the gaseous mixture without, for example, resorting to catalysts. The chemist can also (to a certain extent) distribute directly the energy either in thermal form or in chemical form. He can also intervene on the flux still loaded with active species leaving the gliding arc zone, to have these species reach with the load to be converted in a maturation post-plasma zone.

Our bibliographic research concerning the last three decades yields few published and/or patented results concerning the partially oxidizing conversion of saturated hydrocarbons assisted by plasma. This may be due to the problems connected with the presence of oxygen originating from dissociation of the H2O and/or CO2 molecules and attacking the traditional tungsten or graphite electrodes of classic plasma devices. Nevertheless, we report these attempts to use different sources of plasma. Systematically, both the approach and the reaction process are different from ours. They have only point in common: the use of the word "plasma" or the possibility of treating the same hydrocarbon molecules.

K. KARL et al. [ . . . , CH 378,296 (1957)] proposed hydrocarbon steam reforming under 66.7 kPa-0.3 MPa pressure, in a "silent" discharge characterized by a 0.3–0.5 MV/m very intense electric field. This source of plasma has been known for a century and is totally different from that of the invention.

R. J. HEASON presented, in 1964, his doctorate thesis concerning methane pyrolysis and the reaction of CH4 with water vapor in an arc plasma (700 A, 20 V) in argon. These results are published only in manuscript form ["Investigation of methane and methane-steam reactions in an argon plasma", Dissertation, Ohio State Univ., Columbus]. A "thermal" plasma and a device consuming a great quantity of argon (2 moles Ar for 1 mole CH4) are involved.

C. H. LEIGH and E. A. DANCY ["Study of the reforming of natural gas by a plasma arc", Proc. of the Int. Round Table on Study and Appl. of Transport Phenomena in Thermal Plasmas, contribution 1.5, Odeillo, 1975, 11 pages] heated a mixture of CH4/CO2~1 in a jet of argon plasma, a traditional plasma arc torch. The jet temperature was approximately 10 kK. The argon flux was of the same order of magnitude as that of the mixture to be treated. These researchers observed a 11–74% conversion of carbon to H2, CO, C2H4 and C2H6 (without having ever detected C2H2 or H2O in the products?). No application was possible because of the high consumption of electrical energy (70% of it passed in the plasma torch cooling water) and of noble gas.

Also P. CAPEZZUTO et al. ["The oxidation of methane with carbon dioxide, water vapor and oxygen in radiofrequency discharges at moderate pressures", 3rd Int. Symp. of Plasma Chemistry, Limoges, 1976, contribution G.5.11, 7 pages] studied partial oxidation of methane placed separately in mixture with CO2, either with O2 or with H2O, with the ratios CH4/oxidizer=1. The 35 MHz radiofrequency (RF) plasma reactor needed an additional argon flux and could only work at low pressures of approximately 2.7 kPa. For a 3 to 36 l(n)/min total flow of entering gas, the energy density varied from 1 to 12 kWh/m3. No industrial use was possible because of the high consumption of electrical energy and of noble gas (in addition to the complexity of the electrical supply and the requirement to work under vacuum). The mechanical setup constraints, the low energy yield and the insufficient unit powers of the sources of RF plasma make the use of this method economically poorly suited for the transformation of major volumes of gas. However, it is interesting to note that, in all the cases, the authors observe an almost total conversion of the methane and an appearance of the following products:

For the CH4/CO2 systems, mostly H2, CO, C2H2, with presence of C2H4 (<5%) and of C2H6 (<1%).

For the CH4/H2O system, the same as above but with a few traces of CO2.

A patent by S. SANTEN et al. ["Thermal reforming of gaseous hydrocarbon" GB-A-2 172,011] of 1986, claims the use of a plasma generator to heat reagents (a gaseous hydrocarbon, some water vapor and, possibly, some coal), completely or partially, up to a temperature exceeding 1200° C. At such temperatures, these inventors expect favorable conditions to carry out their purely thermal process without the use of catalysts. The temperatures reached in the reactor and the thermal mode of the reforming (claimed and even emphasized in the title of the patent), therefore indicate a treatment of hydrocarbons under thermodynamic equilibrium. The process is based on a direct arc (two annular electrodes) or transferred arc plasma generator, which are very traditional devices known for almost a century.

L. KERKER writes in a general manner on the tests on production of synthesis gas at Huls [... in German ...]. The illustrations indicate that a tubular reactor with traditional arc, with very high power (1 to 9 MW), is involved; it has been used at this plant since 1939 to produce acetylene. This time, the case involved is a natural gas steam reforming project for the production of 99.9% pure hydrogen, at a very competitive price with respect to electrolysis (although still more expensive than the hydrogen generated by the traditional steam reforming or partial oxidation methods).

Our team in Orleans has also been working since 1986 on the conversion of hydrocarbons in thermal plasma reactors. These traditional torches with simple or transferred arc plasma make it possible to obtain plasmas with relatively small volume, but at very high temperatures ( T>10 kK). Although these devices may be potential sources of active species, they are, nevertheless, poorly suited for chemical applications requiring lower temperatures (in order not to completely demolish the hydrocarbon molecules to soot) and, above all, greater plasmagenic volumes to be able to act intimately on all the fluid to be treated. The plasma torch technology, for example, well established in the solid project domain, has thus been found at the same time very costly and very difficult to implement for chemical processes. However, we have obtained some improvements in the thermal plasma domain in the case of a transformation of methane with carbon dioxide or elementary oxygen in a specifically controlled electric arc, see P. JORGENSEN et al., "Process for the Production of Reactive Gases Rich in Hydrogen and in Carbon Oxide in an Electric Post-Arc, BF 2,593,493, (1986). The structure of the device placed in operation at the time unfortunately did not allow using water vapor as reagent or to work without consuming the argon necessary as plasmagenic gas of a first pilot arc. Later we used almost the same arc with higher current (20–150 A) to study the oxidation of ethylene, see K. MEGUERNES et al., "Oxidation of ethane C2H6 by CO2 or O2 in an electric arc". J. High Temp. Chem. Process, vol. 1(3), p. 71–76 (1992), without much improvement in the consumption of electric energy or of plasmagenic argon.

SUMMARY OF THE INVENTION

It is in order to correct these problems that we studied reforming of pure methane by carbon dioxide in an electro-reactor which had just been invented by our team. It consisted of three electrodes between which gliding discharges develop; the plasma medium thus obtained was very much out of thermodynamic equilibrium and contained numerous excited species which made it highly reactive. This plasma device has been mentioned above under the name of GlidArc. Our first tests on the production of synthesis gas starting from a CH4+CO2 mixture injected into this new type of plasma (without any cooling or plasmagenic argon) were reported by H. LESUEUR et al., "Production of synthesis gas (CO+H2) starting from the oxidation of CH4 by CO2 in a gliding discharge electro-reactor", Physics Colloquium, Supplement to the Journal of Physics, vol. 51 (18), p. C5-49–C5-58 (1990). We later made a more systematic comparison of methane reforming with carbon dioxide in a transferred arc and in the GlidArc to show the great superiority of the gliding arc reactor, see K. MEGUERNES et al., "Oxidation of CH4 by CO2 in an electric arc and in a cold discharge", 11th In. Symp. on Plasma Chem., Loughborough (England), 1993, vol. 2, p. 710–715. Lastly, a complete article on the conversion of CH4 by CO2 was published by H. LESUEUR et al., "Electrically assisted partial oxidation of methane", Int. J, Hydrogen Energy, vol. 19(20, p. 139–144 (1994).

This (pure) methane reforming by (pure) CO2 has shown a very interesting way to upgrade certain gases with high contents of carbon dioxide. However, the products leaving our reactor had an H2/CO molar ratio between 0.5 and 0.8, almost in agreement with reaction (5). Therefore, this gas composition was totally unsuitable for the Fischer-Tropsch technology (synthesis of hydrocarbon synthetic fuels, "syncrude") or similar technology for the production of methanol. The two processes require synthesis gas with an H2/CO ratio near 2:1.

We discovered also that, after a few improvements, the same GlidArc device is well suited for a supply of pure water vapor as the only plasmagenic medium. The overheating tests of the water vapor by means of this device were performed at laboratory scale and at atmospheric pressure. The improved GlidArc was supplied with very wet water vapor at 105° C. No deterioration of the plasma generator supplied with water vapor was observed after several long experiments. The water vapor thus overheated at atmospheric pressure and chemically activated by the presence of H, O, OH and other metastable species may be of interest for drying or for chemical transformations, see P. CZERNICHOWSKI and A. CZERNICHOWSKI, "Gliding electric arcs to overheat water vapor", 9th University-Industry Colloquium "Electrical techniques and quality of drying", Bordeaux-Talence, 1994, p. B1-1–B1-7.

It is at this stage that we thought that traditional steam reforming of pure methane can be improved in the presence of sliding electric arcs which contribute to the reaction medium an easily controllable enthalpy and some highly reactive species. These particular arcs may then play the role of a catalyst in homogeneous phase, see A. CZERNICHOWSKI et al., "Assistance device and process by means of plasma in the non-catalytic steam cracking of hydrocarbon and halogenated organic compounds", BF 2,724,808 (1994).

The previously mentioned methane steam reforming endothermic reaction (1) requires, in order to be fully executed under standard conditions (298 K, 1 atm), an energy equivalent to 206 kJ per transformed CH4 mole, or else at 0.64 kWh per 1 m3(n) of the CO+H2 mixture produced. When the reaction is barely started under standard conditions (the CH4 transformation ratios being only 0.005%), it is necessary, according to Thermodynamics, to heat the reagents to higher temperatures, which requires not only to supply the reaction enthalpy, but also leads to reheating all the mixture. Our calculations indicated that a minimum cost, 0.933 kWh per 1 m3(n), for the CO/H2 equimolar mixture is situated at the temperature of 950 K, where a 75% transformation of initial CH4 is attained. At this stage, the CH4/CO2 molar ratio is too high (4.98) for some applications of this synthesis gas. In order to increase the transformation ratio of methane to approximately 97%, it would be necessary to heat all the reaction mixture to approximately 1200 K at the theoretical cost of 0.986 kWh per 1 m3(n) of the CO/H2 mixture, but the excess hydrogen still exists at an H2/CO level equal to 3.04.

The pure CH4 decomposition in the presence of overheated water vapor in a simple GlidArc reactor, without maturation, has actually yielded large quantities (in terms of percentages by volume) of H2 (up to 68%) and CO (up to 14.8%), while the percentage of C2H2 by volume (max. 1.1%) and C2H4 (max. ~0.34%) were low. In all cases, we had H2/CO molar ratios exceeding the value of 4 and even reaching 5.8!

It is possible to transform CO into H2 or, inversely, H2 into CO via almost athermic reactions (16) and (17), called "shift". This makes it possible to prepare mixtures with the desired composition of synthesis gas for a particular application. Nevertheless, in practice in the industry, these reactions require a separate reactor, and the presence of catalysts and they are accompanied by all the problems due to the complexity, poisoning and aging of the catalytic load, etc.

In order to explain the phenomenon observed of too high an H2/CO ratio in our pure methane steam cracking tests assisted by the GlidArc plasma, we performed a series of tests, see A. CZERNICHOWSKI and K. MEGUERNES. "Electrically assisted water shift reaction", 12th Int. Symp. on Plasma Chem., Minneapolis, Minn., 1995, vol. 2, p. 729–33. By injecting a mixture of carbon monoxide with water vapor in a GlidArc reactor, we did observe reaction (16), without the least presence of traditional catalyst. Therefore, it is the plasma itself which catalyzed this shift, converting CO into H2.

The objective of the process and the plasma assistance device to steam reforming, to the reforming with CO2 or to simultaneous reforming with an H2O/CO2 mixture of hydrocarbons is the production of gases rich in CO and H2, containing also high ratios of C2H2, C2H4 and C3H6, without formation of soot or coke. The process makes it also possible to upgrade the CO2 by converting it into CO in the presence of hydrocarbons.

This mixture of valuable products is obtained in a reactor /1/ with electric gliding arcs /4/ which strike directly into an endothermic reaction medium consisting of hydrocarbons mixed with H2O and/or CO2. The reactor is equipped with a diaphragm /19/ with a convergent/divergent hole /20/ to reinforce the agitation of the arcs with the load to be converted and, at the same time, to have the conversion of the load progress after prolonged contact with catalytic species derived from the plasma.

DETAILED DESCRIPTION OF THE INVENTION

Therefore, we had a new idea, which is the subject of this invention, to apply simultaneously H2O and CO2 to a mixture (with variable composition, as needed) in order to obtain simultaneously during one single operation in the GlidArc reactor, a conversion of certain hydrocarbons by steam reforming (reactions 1 through 4), reforming with carbon dioxide (reactions 5 through 8) and an inverse shift of part of the hydrogen (reaction 17). The purpose of this is to obtain a synthesis gas with a desirable H2/CO molar ratio per further use of this synthesis gas, for example through a Fischer-Tropsch process. This objective has been achieved and, furthermore, we have been surprised by the appearance of other conversion products of the load: C2H4, C2H2 and C3H8 at quite high contents. These unsaturated products can then contribute an additional value to this hydrocarbon conversion process assisted by gliding electric arcs.

Another new idea, which is another feature of this invention, is to divide the old GlidArc reactor into two compartments. By adding a partition, in the form of a diaphragm, we create in this manner a gliding arc compartment with reinforcement of the recirculation of the reagents, and another maturation compartment where the reactions generated in the arc zone can be completed. The two parts of the reactor communicate through a very large hole allowing the reagents and the active species to penetrate the maturation post-plasma zone.

Figure 1:
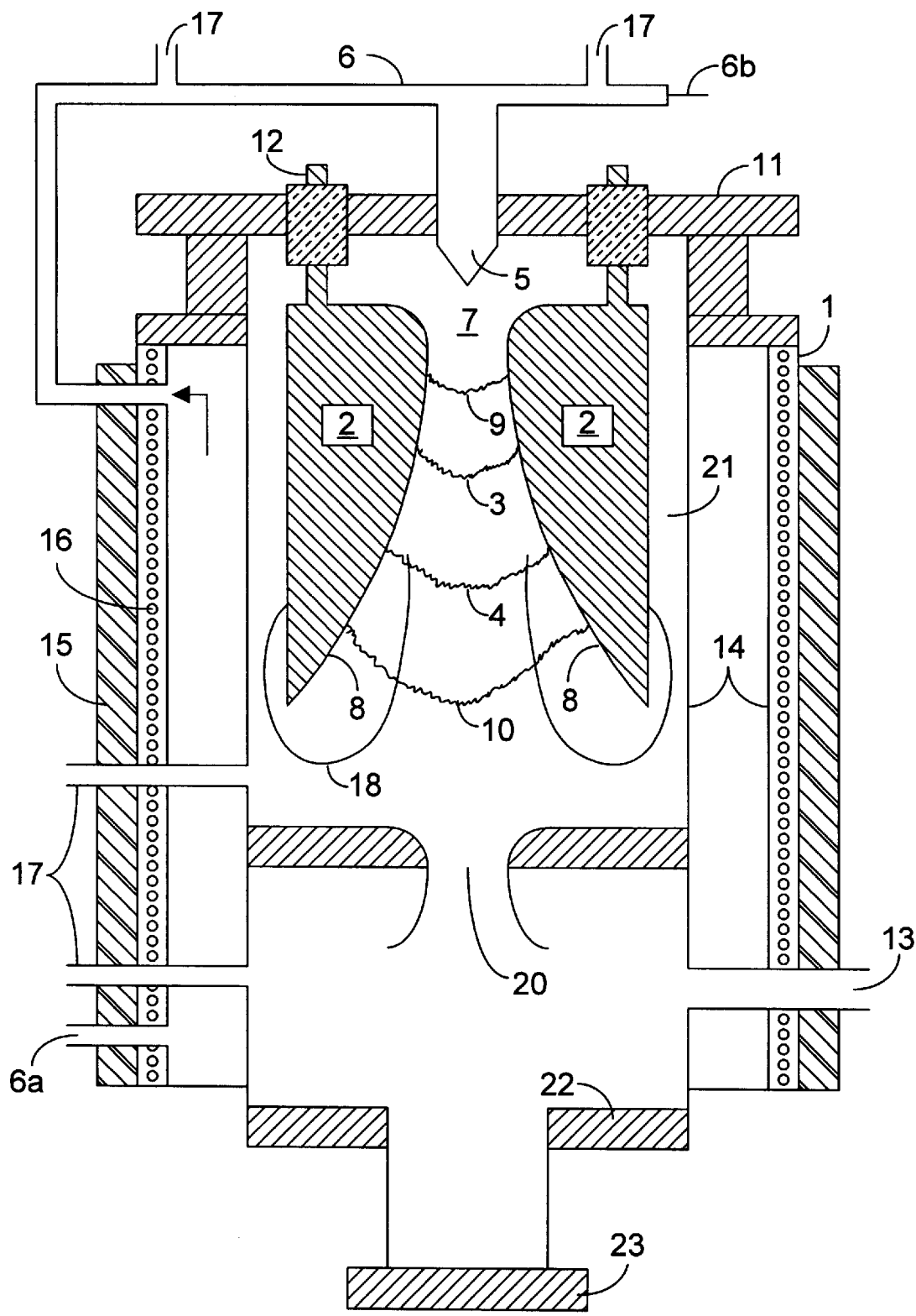
FIG. 1 is a schematic of the reactor used in the inventive method.

Several types of GlidArc reactors may be used. That sketched in FIG. 1 is a small size device (laboratory scale) used to illustrate the invention. Of course, it is only a non-restrictive example of execution of a future industrial-size reactor. The small gliding arc reactor /1/ uses six stainless steel 0.8 mm thick profiled sheet electrodes /2/ (only two of the six electrodes symmetrically arranged around the axis of the flow of the fluid to be treated are shown in FIG. 1). Each one of the electrodes is 14 cm long and 25 mm wide. The electrodes delimit a nipple-shaped space /3/ in which the gliding electric arcs /4/ can develop. This reactor contains a 1.8 mm diameter nozzle /5/ blowing the fluid /6/ to be converted into space /7/ between the electrodes arranged so that the fluid circulates along the central part of these electrodes exposed to the arcs. Thus, the roots /8/ of the arcs, cracking and pre-ionizing the gas at site /9/ where the distance between the electrodes is the least, glide on these electrodes, then disappear at site /10/ near the end of the electrodes, to reappear at the initial site. The process is sequential and the life of an arc /4/ is observed to be between 1 and 20 ms, depending on the linear speed of the fluid in zones /7/, /9/, /3/ and /10/between electrodes /2/. The gliding arcs /4/ have variable characteristics starting from site /9/ where they are started, up to their extinction /10/, specifically with dissipations of energy which grown in time. The reactor is closed by means of a lid /11/ holding the electrically insulated electrodes with high voltage connections /12/. The entire structure is sealed; it withstands a partial vacuum (in the order of 7 kPa) as well as a 12 bars overpressure at the time of combustion of methane-rich mixtures. Lastly, an orifice /13/ is provided as the outlet of the products of the treatment. The reactor with 80 mm inside diameter and 1.5 liters capacity) is equipped with a closed stainless steel double wall /14/, as an envelope. These double walls /14/, insulated by means of mineral wadding /15,/are used to recycle the energy released in the reactor, injecting it into the incoming fluid. The heat losses of the reactor can be further limited by means of a resistor /16/ wound around the reactor and carrying an electric current. Other fluids can be added separately through intake (6b), to form a mixture which is then injected by nozzle /5/. Some holes or take-offs /17/ are used, for example, to branch a pressure gauge, run a thermocouple wire or a sampler of the fluid entering the reactor. Through a fast (>10 ms), almost punctiform injection of the fluid between electrodes /2/, a recirculation phenomenon /18/ of the reagents in the gliding arcs zone is already produced. To reinforce this recirculation, we add a ceramic diaphragm /19/ provided with a wide axial hole /20/, thus dividing the reactor in two parts: a compartment of arcs /21/, approximately ⅔ of the total volume of the reactor, and a "maturation" compartment /22/, equal to approximately ⅓ of the total volume of the reactor. Hole /20/, with convergent/divergent shape (18 mm in diameter in the narrow part) allows the reagents (partially used up) to pass, as well as the long-living active species originating from the excitation of the gases by the gliding arcs. Therefore, in the maturation zone, the conversion is likely to be ended in an environment in which the temperature is much lower. The fluid, once in this post-plasma zone, cannot any longer return to the arc zone. The bright zone of the gliding electric arcs can be observed through a 12 mm diameter porthole /23/, in order to make certain of the proper operation of the reactor. Very important information can be drawn from the emission spectrum of this zone! The conversion of the hydrocarbons can be sufficiently advanced at the time of passage through a single GlidArc reactor. Otherwise, the products partially converted in a reactor can be treated in several reactors thus described and placed in series (not shown).

Special care must then be emphasized at the time of installation of diaphragm /19/ in the shape of a convergent/divergent hole. These new means create a new maturation reaction zone in which very active and metastable species (thus having catalytic properties) make it possible to reform hydrocarbons resulting from violent reactions in the plasma zone, can be deactivated on other molecules and thus cause the conversion of the reagents to progress even faster. Physics provide us with information on such atomic and molecular species as H, OH, O2, CO2, CO, H2, H3 (and many others) which have a sufficiently long life to travel long distances in the gas flux, even at atmospheric pressure. This phenomenon is very important for the conversion of hydrocarbons known for their fragility. In fact, the action of a non-thermal (or out of equilibrium) plasma, such as the GlidArc plasma coupled with the maturation post-plasma zone enables us to completely prevent coking of the hydrocarbon load. Long hours of operation of the reactor thus built and perfect transparency of the porthole (all this in the presence of hydrocarbons as fragile as propane and butanes) are the best proof of "soft" transformations which can be executed in a GlidArc reactor with said post-plasma compartment.

The reactor is supplied by controlled flows (by mass flowmeters) of gas taken from bottles (or other sources) and/or of the water vapor produced by a generator. The supply of the reactor with an initially liquid substance at ambient temperature (for example, a heavier hydrocarbon or water) can also be carried out by using a dosing pump. The constant flow of this liquid, controlled by a valve and a flowmeter, is thus evaporated in an oven, to be then injected between the double walls and, lastly, into the reactor, whether or not previously mixed with another fluid of the process.

Chemical analyses are performed, using traditional gas chromatographic methods. We use three chromatographs, each assigned to the specific dry gases: CO, CO2 and CH4 for the first, hydrogen alone for the second, and all the hydrocarbons for the third. The flow of the water vapor in the products is quantified by trapping a known volume of exiting gases.

The gliding arcs inside the reactor are supplied by a special high voltage system ensuring at the same time preionization of the medium and then transfer of the electrical energy to the plasma. The electric power of the reactor used varies between 0.57 and 1.09 kW under 0.1 or 0.2 A for a flow rate of fluids to be treated from 0.57 to 1.23 m3(n)/hr; the energy supply with respect to the load is 0.47 to 1.23 kWh/m3(n). Nothing nevertheless prevents using more power, higher flow rates and/or greater energy for industrial operations.

Figure 2:
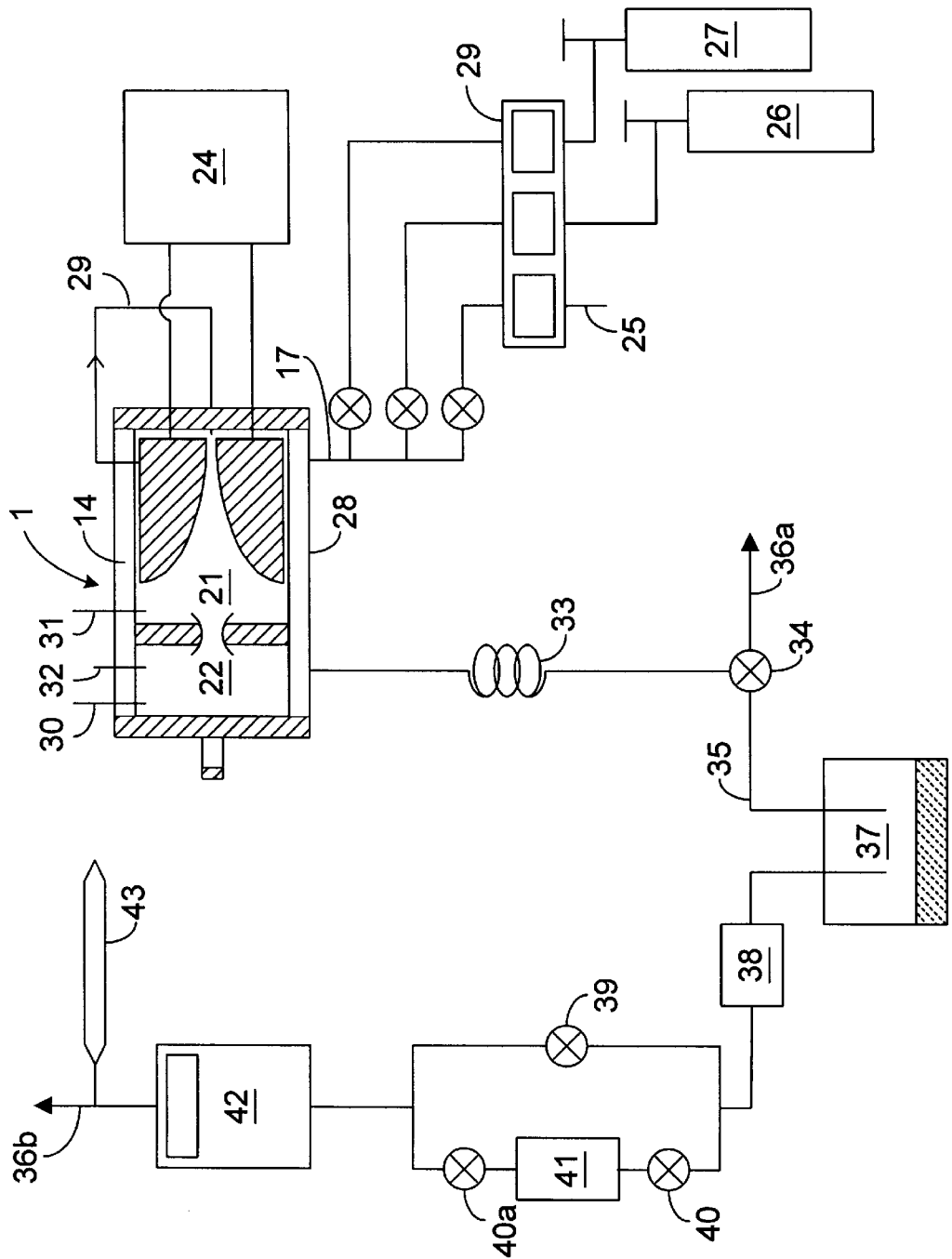
FIG. 2 is a schematic diagram of the entire reactor system used in the inventive method.

Reforming of a natural gas (NG) or of a "propane" will be better understood with the help of FIG. 2. The reactor used is that shown in FIG. 1. FIG. 2 is a schematic representation of the apparatus as a whole. In this figure, the GlidArc reactor /1/ is supplied by a special high voltage power generator /24/. It is operated directly with, as plasmagenic gas, a NG taken from the city supply network /25/ (or with the "propane" /26/ from a pressurized cylinder), mixed with carbon dioxide /27/, water vapor (or liquid water) /28/ or with the CO2/H2O mixture. The gas flow rates are controlled by mass flowmeters /29/. The gas mixture entering (dry) can be sampled for chromatographic analysis through a take-off /17/. The flow rate of the water vapor is also known after calibration of the dosing pump of the device /28/. The thermocouple /29/ makes it possible to measure the temperature of the fluid at the entry of the injection nozzle while the probes /30/ and /31/ indicate the temperatures in the two compartments of the reactor. A pressure gauge /32/ gives at any time the pressure inside the reactor: this pressure is kept slightly higher than atmospheric pressure. The products leaving the reactor are cooled in a heat exchanger in the air /33/. After leaving the exchanger, the gases are directed to a direction invertor tap /34/ which sends them either to analysis /35/ or to evacuation stack /36a/. At the time of our tests, we collect and weigh the water leaving the reactor, by condensation /37/ and absorption /38/, as well as the dry gaseous product for chromatographic analyses. To this effect, the wet gas is conveyed to outlet /36a/, then when we estimate that the reactor is operating in stable condition (pressure, temperatures, gas flow rates, water vapor flow rate, electrical power), tap /34/ is reversed and it is sent to analysis /35/. The water is stored in the greatly cooled flask /37/ and in an absorbing material. Tap /39/ being first closed and taps /40/ and /40a/ open, the dry gas runs through a bulb or a spherical flask /41/ then through gas meter /42/ and leaves the experimental device through /36b/ for the evacuation stack, The temperature of the gas at the outlet of the meter /42/ is measured by a thermometer /43/. At the time of each test, also the atmospheric pressure is measured with a barometer, in order to bring our balances of volumes to normal conditions (n).

Numerous feasibility tests of the reforming process of natural gas or "propane" were performed in the new reactor with the maturation compartment (we are presenting only the most significant tests). The composition (% by volume) of the NG originating from the city distribution network was not changing much: CH4 from 89.7 to 91.9; C2H6 from 6.6 to 6.8; C3H8 from 1.1 to 1.2, C4H10 from 0.25 to 0.29 (mixture of n- and iso-butane); O2 from 0.17 to 0.34; and N2 from 1.2 to 1.8. Besides, we were analyzing carefully this NG at the time of each test in order to establish an exact balance of matter. The composition (% by volume) of the "propane" contained in a bottle was: CH4 0.1; C2H6 1.0; C3H8 96.7; C3H6 0.3; and C4H10 1.9 (also a mixture of and iso-butane).

Table 1 summarizes examples G1 through G5 of natural gas steam reforming. Table 2 summarizes examples G11 and G12 of NG reforming with CO2 alone. Table 3 summarizes examples G21 through G23 of NG reforming simultaneously with an H2O/CO2 mixture. Lastly, Table 4 illustrates our tests P1 through P3 with the "propane" in the simultaneous presence of water vapor and carbon dioxide. All our experiments were performed at a slightly higher than atmospheric pressure.

Each table is divided horizontally in three parts. The first part indicates the nature and quantity of the fluids injected in the reactor and the specific energy injected in the plasma (the actual electric energy of the GlidArc compared to the normal hourly flow rate of all the entering reagents), as well as the temperature of the fluid entering the reactor, that inside the plasma compartment (but not in contact with the gliding arcs) and that inside the maturation compartment.

The second part of each table indicates the volumes (in normal liters) of dry products from the process leaving the reactor after the injection of 1 kWh of electric energy in the GlidArc plasma under experimentation conditions. Thus, these values indicate a real energy cost (in electricity) of the process at laboratory scale. This section indicates also the energy cost of a unit mass of CO (other products considered "at no cost") or of a unit volume of synthesis gas (other products also considered "at no cost") having a given H2/CO ratio.

The third part of each Table indicates other results of calculations based on the experimental data: the global rate of conversion of carbon of NG origin (or from "propane") and possibly of CO2 origin, the conversion rates of the different hydrocarbons present in the NG (or in the "propane"), as well as the specificities pertaining to conversion of carbon present in the NG (or in the "propane") and possibly of CO2 to useful products.

We add again the absence of coke, soot, tar or other pyrolytic compounds in our products (within the limits not exceeding 0.5% expressed as mass of converted carbon).

TABLE 2

| Example | | G11 | G12 |
|---|---|---|---|
| Incoming flow rate, 1(n)/h | NG | 328 | 328 |
| | CO2 | 438 | 438 |
| Specific energy | kWh/m3(n) | 0.75 | 1.42 |
| Temperature (° C.) | entry | 140 | 165 |
| | reaction | 290 | 380 |
| | maturation | 160 | 180 |
| Exit 1(n)/kWh | C2H4 | 3.9 | 2.8 |
| | C2H2 | 13.9 | 7.1 |
| | C3H6 | 0.2 | 0.2 |
| | CO | 205 | 151 |
| | H2O | 38 | 19 |
| | H2 | 173 | 124 |
| H2/CO, mol/mol | | 0.84 | 0.82 |
| Energy cost | CO,kWh/kg | 3.9 | 5.3 |
| | H2 + CO, kWh/m3(n) | 2.6 | 3.6 |
| Carbon conversion (%) | of NG origin | 8.3 | 11.4 |
| | of CO2 origin | 9.0 | 11.8 |
| Conversion of hydrocarbons present in the NG (%): | CH4 | 17 | 24 |
| | C2H6 | 25 | 35 |
| | C3H8 | 25 | 33 |
| Specificities regarding carbon conversion (%) to . . . | C2H4 | 3 | 3 |
| | C2H2 | 11 | 8 |
| | C3H6 | 0.2 | 0.3 |
| | CO | 85 | 88 |

TABLE 1

| Example | | G1 | G2 | G3 | G4 | G5 |
|---|---|---|---|---|---|---|
| Incoming flow rate 1(n)/h | NG | 424 | 424 | 424 | 424 | 424 |
| | water vapor | 473 | 606 | 785 | 803 | 458 |
| Specific energy | kWh/m3(n) | 1.13 | 1.02 | 0.90 | 0.47 | 1.21 |
| Temperature (° C.) | entry | 220 | 215 | 215 | 200 | 250 |
| | reaction | 630 | 590 | 560 | 490 | 680 |
| | maturation | 310 | 300 | 290 | 300 | 380 |
| Outgoing 1(n)/kWh | C2H4 | 5.8 | 5.0 | 4.5 | 4.9 | 7.0 |
| | C2H2 | 14.0 | 10.0 | 8.7 | 12.8 | 9.6 |
| | C3H6 | 0.4 | 0.3 | 0.3 | 0.3 | 0.5 |
| | CO | 67.5 | 65.8 | 64.4 | 65.6 | 60.1 |
| | CO2 | 5.0 | 5.9 | 8.5 | 7.9 | 6.2 |
| | H2 | 262 | 248 | 240 | 248 | 272 |
| H2/CO, mol/mol | | 3.9 | 3.8 | 3.8 | 3.9 | 4.5 |
| Energy cost | CO, kWh/kg | 11.9 | 12.2 | 12.6 | 12.6 | 13.3 |
| | H2 + CO, kWh/m3(n) | 3.0 | 3.2 | 3.3 | 3.2 | 3.0 |
| Carbon conversion (%) | | 25.1 | 23.5 | 23.6 | 13.4 | 23.6 |
| Conversion of hydrocarbons present in the NG (%) | CH4 | 23 | 22 | 22 | 13 | 20 |
| | C2H6 | 35 | 31 | 32 | 15 | 41 |
| | C3H8 | 42 | 34 | 37 | 21 | 47 |
| Specificities pertaining to carbon conversion (%) to | C2H2 | 10 | 10 | 9 | 9 | 14 |
| | C2H6 | 25 | 20 | 18 | 24 | 19 |
| | C3H6 | 1 | 1 | 1 | 1 | 2 |
| | CO | 59 | 64 | 64 | 59 | 59 |
| | CO2 | 4 | 6 | 9 | 7 | 6 |

TABLE 3

| Example | | G21 | G22 | G23 |
|---|---|---|---|---|
| Incoming flow rate, 1(n)/h | NG | 495 | 484 | 446 |
| | CO2 | 52 | 138 | 138 |
| | Water Vapor | 332 | 254 | 177 |
| Specific energy, | kWh/m3(n) | 1.23 | 1.07 | 1.33 |
| Temperature (° C.) | entry | 240 | 230 | 230 |
| | reaction | 665 | 660 | 675 |
| | maturation | 390 | 395 | 405 |
| Exit | C2H4 | 6.8 | 6.4 | 6.2 |
| | C2H2 | 13.5 | 17.2 | 6.7 |
| | C3H6 | 0.5 | 0.5 | 0.6 |
| | CO | 80.9 | 95.3 | 88.0 |
| | H2 | 268 | 245 | 218 |
| H2/CO, mol/mol | | 3.3 | 2.6 | 2.5 |
| Energy cost | CO.kWh/kg | 9.9 | 8.4 | 9.1 |
| | H2 + CO.kWb/m3(n) | 2.9 | 2.9 | 3.3 |
| Carbon conversion (%) | of NG origin | 21.6 | 17.0 | 15.6 |
| | of CO2 origin | 1.1 | 3.5 | 3.2 |
| Conversion of hydrocarbons | CH4 | 20 | 18 | 17 |
| present in the NG (%): | C2H6 | 41 | 36 | 37 |
| | C3H8 | 47 | 40 | 42 |
| Specificities regarding carbon | C2H4 | 11 | 9 | 11 |
| conversion (%) to | C2H2 | 22 | 24 | 11 |
| | C3H6 | 1 | 1 | 1 |
| | CO | 66 | 66 | 76 |

TABLE 4

| Example | | P1 | P2 | P3 |
|---|---|---|---|---|
| Incoming flow rate, 1(n)/h | "propane" | 343 | 223 | 207 |
| | CO2 | 221 | 221 | 180 |
| | water vapor | 512 | 226 | 309 |
| Specific energy | kWh/m3(n) | 0.77 | 1.33 | 1.36 |
| Temperature (° C.) | entry | 215 | 220 | 220 |
| | reaction | 510 | 610 | 625 |
| | maturation | 330 | 325 | 350 |
| Exit, 1(n)/kWh | C2H4 | 19.5 | 21.3 | 23.5 |
| | C2H2 | 31.0 | 19.1 | 21.5 |
| | C3H6 | 5.2 | 5.9 | 6.5 |
| | CO | 105 | 120 | 123 |
| | H2 | 227 | 203 | 222 |
| H2/CO, mol/mol | | 2.2 | 1.7 | 1.8 |
| Energy cost | CO.kWh/kg | 7.6 | 6.8 | 6.5 |
| | H2 + CO, kWh/m3(n) | 2.9 | 3.1 | 2.9 |
| Carbon conversion (%) | of "propane" origin | | | |
| | of CO2 origin | | | |
| Specificities regarding carbon | C2H4 | 16 | 18 | 24 |
| conversion (%) to | C2H2 | 26 | 16 | 22 |
| | C3H6 | 5 | 6 | 7 |
| | CO | 44 | 50 | 46 |

The comparison of our recent results from NG steam reforming (shown in Table 1) with the preceding results taken from experiments performed on pure methane in the GlidArc reactor without soaker (see A. CZERNICHOWSKI et al., 1994, Tables 2 and 4, experiments M4 and M10) clearly indicates the superiority of the new device (described above). Table 5 illustrates these differences for similar conditions (respectively G3 and G4), concerning the H2O/hydrocarbon ratio and the energy supply to the load to be converted:

TABLE 5

| Example | | G3 | G4 | M4 | M10 |
|---|---|---|---|---|---|
| Specific energy, kWh/m3(n) | | 0.90 | 0.47 | 0.94 | 0.42 |
| H2O/hydrocarbon at entry (mol/mol) | | 1.85 | 1.89 | 1.89 | 1.71 |
| Temperature (° C.), | reaction | 560 | 490 | 345 | 220 |
| | maturation | 310 | 300 | non | non |
| Exit (mol/mol) | C2H4/C2H2 | 0.52 | 0.38 | 0.28 | 0.22 |

TABLE 5-continued

| Example | | G3 | G4 | M4 | M10 |
|---|---|---|---|---|---|
| | (C2H2 + C2H4 + C3H6)/CO | 0.21 | 0.27 | 0.11 | 0.18 |
| | H2/CO | 3.8 | 3.9 | 4.0 | 4.3 |

Hence, we now obtain many more unsaturated hydrocarbons. At the same time, for a similar H2/CO ratio, the C2H4/C2H2 ratio is higher. These results witness reinforcement of the recirculation in the GlidArc compartment shortened by installation of the diaphragm. Thus, the hydrocarbon load can be in closer and more prolonged contact with the gliding arc zone; that is where much acetylene is created. At the same time, we observe partial hydrogenation of the acetylene to ethylene, which occurs outside the arcs in the maturation compartment. In an environment in which the temperature is sufficient to ensure very rapid partial hydrogenation kinetics, part of the acetylene is converted to ethylene, a product even more sought for its multiple applications.

We point out that, for the first time, we have performed steam reforming of ethane, propane and butanes present in the natural gas used as reagent. On the basis of our comparative chemical analyses and our exact balances of material entering and leaving the GlidArc reactor (see Table 1), we determine that the conversion of the ethane and of the propane is much higher than that of the methane. Furthermore, the conversion of the propane is greater than that of the ethane. The ratio of these hydrocarbons in the incoming gas is CH4:C2H6:C3H8~79:6:1. Their mean conversion is (in relative scale) in inverse proportion to CH4:C2H6:C3H8~1:1.5:1.8. This indicates that, thanks to this steam reforming process of hydrocarbon loads containing increasingly heavy hydrocarbons, their conversion is attained with increasing ease and with the same specific energy applied to the incoming load. The steam reforming process assisted by gliding arcs could then be applied, whatever the natural gas (or other mixture of hydrocarbons) to be converted.

We note that the global conversion rate is limited in all the experiments presented here in order to better study the individual conversion phenomena of each component of the NG or of the "propane". This conversion can obviously be much greater, for example, following an increase of the specific energy injected in the reagents.

The other comparison of our results of conversion of the NG containing CO2 (shown in Table 2) with our previous results concerning experiments on the mixture of pure methane with some CO2 brought into a GlidArc reactor without maturation compartment (see H. LESUEUR et al., 1994, Table 1) confirms the superiority of the device now described. For example, under the previous "B" conditions (specific energy equal to 0.94 kWh/m3(n) and the CO2/CH4 molar ratio=1.13), the energy cost of the CO produced is similar, but the H2/CO ratio obtained is better, exceeding the 0.8 value, while the previous ratio was 0.6. We emphasize also that, for the first time, we have performed reforming with carbon dioxide of ethane, propane and butanes present in the NG (used as reagent). According to our analyses and exact balances (see Table 2), we observe that the conversion of the ethane and of the propane is more pronounced than that of the methane. Their average conversion is, on a relative scale, in CH4:C2H6:C3H8 ratio of ~1:1.5:1.5, despite a very high excess of methane in the NG studied. This indicates again that the reforming process with CO2 of hydrocarbons heavier than methane would be easier.

The reforming process with CO2, assisted by gliding arcs, could then be applied with any natural gas (or other mixture of hydrocarbons) to be converted. We are thinking, for example, of the different biogases or of certain gas resources with mixtures of hydrocarbons and carbon dioxide. These gases can thus be upgraded without costly separation of CO2. Moreover, having available a "clean" energy source (solar, hydraulic, nuclear, etc.), we could thus recycle the carbon dioxide, which is a formidable contemporary problem.

We are demonstrating for the first time the feasibility of a new hydrocarbon conversion process assisted by gliding arc plasma in the simultaneous presence of carbon dioxide and water vapor. This process is illustrated in Tables 3 and 4 by the conversion of two model mixtures of hydrocarbons in a new reactor provided with a post-plasma maturation compartment. In the simultaneous presence of water vapor and CO2, we can thus convert all hydrocarbons such as CH4, C2H6, C3H8 and/or C4H10 into synthesis gas and partially also into other valuable products: C2H4, C2H2 and C3H6, without using traditional catalysts. In particular, in the Asia-Pacific countries and Pakistan there exists great amounts of CO2 in the natural gas. Huge gas fields are reported in Indonesia having CO2 contents upwards of 70 v % (Exxon Natuna, for example). Fields in Pakistan range from 6 to 80 v % CO2. Removing this CO2 is not only expensive but also presents a disposal problem. While reinjection into an aquifer is a possibility, it is also expensive and an adequate aquifer must be located nearby. This invention uniquely enables large CO2 contents to remain in the natural gas and yet produce synthesis gas suitable for synfuel or petrochemical production. The ability of this invention to convert high CO2 natural gas into synthesis gas to produce valuable end products promises to open new routes to reduce global carbon emissions.

A wide range of ratios of two oxidizers can be used. Although our examples are given for H2O/CO2 values between 1.0 and 6.4, the fact of being able to use only one oxidizer makes it possible to widen this ratio for values between 0 and ∞. Hence, all the H2O/CO2/hydrocarbon mixtures can be converted in the GlidArc reactors without prior separation of components. According to necessity, we can then obtain a synthesis gas with an H2/CO ratio near 2 for the synthesis of synthetic oil or of methanol, or of a synthesis gas very rich in hydrogen for the synthesis of ammonia, or yet of a gas very rich in CO per "oxo" . . . these synthesis examples not being restrictive.

We note the complete absence of soot, cokes or other undesirable products from the conversion of heavy hydrocarbons, such as the butanes present in non-negligible quantity at the time of our tests. On the contrary, the increasing fragility of increasingly heavy hydrocarbons is a "plus" for our process, from the point of view of the energy cost for the production of CO and also of other valuable unsaturated products. In some cases, this cost is reduced by half by passing from methane-rich gas to propane-rich gas. This is a strong point of our process when compared with the traditional processes confronted with the problem of deposition of cokes and tars, especially in the presence of heavier hydrocarbons than methane.

Lastly, we point out the presence of non-negligible quantities (but at adjustable content) of unsaturated hydrocarbons C2H4, C2H2 and C3H6 in our products from conversion assisted by GlidArc plasma. They contribute an additional value as final commercial product (acetylene) or as raw material for other organic syntheses. Mixed with synthesis gas, they also facilitate the construction of hydrocarbon chains at the time of the Fischer-Tropsch synthesis (information from recent scientific work by Professor A. LAPIDUS of the Organic Chemistry Institute of Moscow). Thus, formed simultaneously with the CO and H2 during the conversion of hydrocarbons in the Glid-Arc, these unsaturated molecules can contribute to the direct application of an improved synthesis of liquid hydrocarbons.

On a more technical level, it must be pointed out how surprisingly easy is the operation of the reactor and of its assembly, without deterioration of electrodes, electrode holders, diaphragm or wall of the reactor or of the maturation compartment, all submitted to the action of the incoming reagents and of the outgoing products. This is explained by the moderate temperature of the assembly (<680° C.) and by a very short contact time between the roots of the arcs with the electrodes, even if made of steel and even if not cooled. We did not encounter any problems in the implementation of the plasmagenic gases chosen: the mixtures of hydrocarbons with water vapor and/or CO2.

Our experiments have demonstrated the feasibility of the new process of production of gases rich in hydrogen and carbon monoxide, containing also very large quantities of C2H4, C2H2 and C3H6.

The process consists of manufacturing these gases by means of gliding electric arcs which strike directly in the hydrocarbon mixed with water vapor and/or with carbon dioxide in any proportions. This causes the oxidation and/or partial cracking of these hydrocarbons, avoiding the disadvantages of the existing processes. The reagents, partially converted in a gliding arc compartment, then penetrate another maturation compartment which is separated from the direct reaction zone by a diaphragm with a large hole. There, in the presence of the still active species produced in the arcs and transported by the gas leaving the arc zone, the gas undergoes an additional conversion at a much lower temperature than that present in the direct reaction zone.

The subject of this invention then is a process which allows the partial cracking and oxidation of the hydrocarbons in the active presence of water vapor and/or carbon dioxide, without any need for other reagents or catalysts and without the formation of soot, coke or tar with the proper operation of the reactor. The tests clearly demonstrate the ease of reforming with steam, or carbon dioxide or simultaneous reforming with an H2O/CO2 mixture accompanied by non-catalytic hydrocarbon cracking.

The invention makes it also possible to transfer directly electrical energy under high voltage and relatively low current to an endothermic reaction medium. These electrical conditions, combined with high speed of the plasmagenic medium in the arc zone, cause a strong electric and also thermodynamic non-equilibria. The material injected into this non-equilibrium plasma zone created in the GlidArc device then reacts in non-thermal manner.

No difficulty was noted at the time of the experiments and the extrapolation for large volumes is easy. Despite a non-optimized reactor and only one pass of the reagents through the GlidArc compartment, a large part of the initial molecules is converted into synthesis gas and into unsaturated hydrocarbons. This conversion is greatly improved by the almost punctiform injection of the reagents into the arc zone by using a fine nozzle and also by means of a diaphragm with a convergent/divergent hole placed axially and reinforcing recirculation of the reagents in this direct reaction zone.

Other positive points can also be claimed for a future practical application:

transformation of hydrocarbons and possibly of CO2 into products with much greater value (H2, CO, unsaturated hydrocarbons), the only reagent necessary is water and/or CO2, the absence of any catalyst, the very compact equipment which can be installed at sites with restricted surface area (for example on offshore oil platforms for the conversion of associated gases).

the method does not depend on the chemical composition of the mixture of hydrocarbons, the Glid-Arc reactor has no chemical inertia and can respond very quickly to control signals, the incoming and outgoing products, after condensation of the water vapor, do not carry any foreign ballast increasing their volume, which makes the conversion operations easier.

What is claimed is:

1. A hydrocarbon conversion process, comprising:

providing a gliding arc reactor comprising an arc compartment and a maturation compartment partially divided by a diaphragm, wherein a hole is defined in said diaphragm for transporting gas therethrough;

introducing a mixture in gaseous form into said gliding arc reactor, wherein said mixture in gaseous form comprises a hydrocarbon and an oxygen-containing oxidizer;

submitting said mixture to a gliding electric arc within said arc compartment for converting at least a portion of said hydrocarbon into synthesis gas such that said mixture further comprises synthesis gas, said synthesis gas comprising hydrogen H2 and carbon monoxide CO; and transporting said mixture from said arc compartment into said maturation compartment through said hole in said diaphragm.

2. The process of claim 1, wherein said oxidizer comprises water vapor H2O.

3. The process of claim 1, wherein said oxidizer comprises carbon dioxide CO2.

4. The process of claim 1, wherein said oxidizer comprises carbon dioxide CO2 and water vapor H2O.

5. The process of claim 1, wherein said synthesis gas comprises one or more unsaturated hydrocarbons, and wherein said one or more unsaturated hydrocarbons comprises an unsaturated hydrocarbon selected from the group consisting of acetylene C2H2, ethylene C2H4 and propylene C3H6.

6. The process of claim 1, wherein said mixture in gaseous form comprises said oxidizer in a volumetric oxidizer/hydrocarbon ratio equal to at 0.7 to less than stoichiometric.

7. The process of claim 6, wherein said mixture in gaseous form comprises CO2, and wherein said submitting said mixture to a gliding electric arc comprises reacting said CO2 with said hydrocarbon for converting the CO2 into carbon monoxide CO.

8. The process of claim 7, wherein said submitting said mixture to a gliding electric arc is performed at a pressure between 7 kPa and 12 bars and wherein the temperature of the gas outside of said gliding electric arc and within said arc compartment during said submitting is less than or equal to 680° C.

9. The process of claim 8, wherein said synthesis gas further comprises an unsaturated hydrocarbon selected from the group consisting of ethylene, acetylene and propylene, and wherein said synthesis gas has an H2/CO ratio of between 0.8 mol/mol and 4.5 mol/mol, and an unsaturated hydrocarbons/CO ratio greater than 0.06 mol/mol.

10. The process of claim 9, wherein after said transporting said mixture, a percentage of soot, coke or tars within said mixture is at most 0.5%, expressed in mass of converted carbon.

11. A device for hydrocarbon conversion comprising a gliding arc structure for creating a plasma, said gliding arc structure placed in an arc compartment, a maturation compartment separated from said arc compartment by means of a diaphragm, said diaphragm having a hole therethrough such that gasses are allowed to pass between said arc compartment and said maturation compartment directly through said hole in order to reinforce recirculation in the arc compartment.

12. The process of claim 1, wherein a first temperature within said arc compartment is greater than a first temperature within said maturation compartment, and wherein said converting at least a portion of said hydrocarbons into synthesis gas continues in said maturation compartment.

13. The process of claim 1, wherein said hole in said diaphragm is an axially located convergent/divergent hole, and wherein said diaphragm substantially prevents said mixture from returning to said arc compartment after said transporting.

14. The process of claim 13, wherein said diaphragm divides said reactor such that said arc compartment occupies about ⅔ of a total volume of said reactor and said maturation compartment occupies about ⅓ of said total volume of said reactor.

15. The device of claim 11, wherein said gliding arc structure comprises a plurality of concentrically arranged gliding arc electrodes.

16. The device of claim 15, wherein a nipple-shaped space is defined between said plurality of gliding arc electrodes, and wherein said gliding arc structure is configured to produce gliding arcs that glide from a narrow end of said plurality of gliding arc electrodes to a wide end of said plurality of gliding arc electrodes during operation.

17. The device of claim 11, wherein said diaphragm comprises a ceramic, and wherein said diaphragm is configured to substantially prevent gases that have entered said maturation compartment from returning to said arc compartment.

18. The device of claim 17, further comprising a nozzle for allowing a substantially punctiform introduction of gases into said device.

19. The device of claim 11, wherein said diaphragm divides said device such that said arc compartment occupies about ⅔ of a total volume of said device and said maturation compartment occupies about ⅓ of said total volume of said device.

20. The device of claim 11, wherein said device comprises a porthole for observing the performance of said device during operation.

21. A hydrocarbon conversion process, comprising:
  providing a gliding arc reactor comprising a gliding arc structure for producing a gliding electric arc;
  introducing a mixture in gaseous form into said gliding arc reactor, wherein said mixture in gaseous form comprises a hydrocarbon gas and an oxygen-containing oxidizing gas, said oxidizing gas comprising carbon dioxide CO2 and water vapor H2O; and
  submitting said mixture to a gliding electric arc for converting at least a portion of said mixture into synthesis gas such that said mixture comprises synthesis gas, said synthesis gas comprising hydrogen H2 and carbon monoxide CO.

22. The process of claim 21, wherein a volumetric ratio of said oxidizing gas to said hydrocarbon gas within said mixture in gaseous form is equal to at least 0.7 to less than stoichiometric.

23. The process of claim 21, wherein said hydrocarbon gas comprises methane, and wherein said synthesis gas comprises one or more unsaturated hydrocarbons.

24. The process of claim 21, wherein said one or more hydrocarbons is selected from the group consisting of ethylene, acetylene and propylene, and wherein said synthesis gas has an H2/CO ratio of between 0.8 mol/mol and 4.5 mol/mol, and an unsaturated hydrocarbons/CO ratio greater than 0.06 mol/mol.

25. The process of claim 21, wherein said converting is performed in the absence of catalyst.

26. The process of claim 21, wherein after said submitting said gaseous mixture to a gliding electric arc, a percentage of soot, coke or tars within said mixture is at most 0.5%, expressed in mass of converted carbon.

27. The process of claim 21, wherein said submitting said mixture to a gliding electric arc is performed at a pressure between 7 kPa and 12 bars and wherein a temperature of within said reactor and outside of said gliding electric arc during said submitting is less than or equal to 680° C.

\* \* \* \* \*

UNITED STATES PATENT AND TRADEMARK OFFICE
CERTIFICATE OF CORRECTION

PATENT NO. : 5,993,761
DATED : November 30, 1999
INVENTOR(S) : Albin Czernichowski
Piotr Czernichowski It is certified that error appears in the above-identified patent and that said Letters Patent is hereby corrected as shown below:

In the Claims:

In column 18, line 59, after "equal to" delete [at].

In column 20, line 28, after "is equal to" delete [at least].

Signed and Sealed this

Nineteenth Day of September, 2000

Q. TODD DICKINSON

*Attest:*

*Attesting Officer*　　　　　*Director of Patents and Trademarks*